Feb. 13, 1962 R. J. CLARK 3,021,386
BOILER PORT VIEWING SYSTEM
Filed March 30, 1960

INVENTOR.
RICHARD J. CLARK
BY Joseph P. Kates
ATTORNEY

United States Patent Office 3,021,386
Patented Feb. 13, 1962

3,021,386
BOILER PORT VIEWING SYSTEM
Richard J. Clark, North Syracuse, N.Y., assignor to General Electric Company, a corporation of New York
Filed Mar. 30, 1960, Ser. No. 18,581
16 Claims. (Cl. 178—6)

The present invention relates to a port viewing system for viewing from a remote point the interior of an enclosure wherein hazardous conditions prevail such that direct viewing by a television camera (or by an observer) is not feasible. More particularly this invention relates to apparatus adapted to be combined with a closed circuit television camera for viewing the interior of a hazardous atmosphere such as occurs in a boiler, oven or kiln without damage to the camera and televising the scene therein for projection to a receiver which is remotely located with respect to the location of the camera and of the boiler or kiln.

Briefly, the present invention provides a plate to cover a viewing aperture in a wall of a hazardous enclosure (such as that enclosing a high temperature reaction, i.e. a kiln or a boiler). The kiln or boiler plate is apertured to receive a flexible and high temperature resistant silicone gasket which gasket is apertured. An external housing or shroud containing a variable focal length lens is inserted to protrude through the gasket aperture. The front wall of the shroud is disposed within the hazardous enclosure and is apertured. The shroud aperture is made of small diameter. The periphery of the shroud aperture is bevelled or chamferred outwardly. The bevel permits a conical view of a portion of the enclosure through the variable focal length lens. A camera such as a closed circuit television camera is detachably connected to the rear portion of the shroud or housing. Means for introducing air under pressure into the shroud is provided. The interior surface of the housing is roughened for turbulent flow of the introduced air. The air is expelled from the apertured front portion of the variable focal length lens housing to form a protective barrier against particles hitting the lens surface. The lens housing is highly polished to reflect heat or other energy away so that the heat is not conducted to the lens. Insulating support means shaped so as not to interfere with air flow therethrough are introduced between the lens and its housing to insure spacing to form a plenum chamber therebetween.

Prior art systems of viewing the interior of hazardous enclosures such as the interiors of kilns and boilers include that of Patent No. 2,157,413, issued May 9, 1939, to David J. Howard for Window for Stoves and that of Patent No. 2,850,005, issued September 2, 1958, to James A. Good and James C. Magestro for Observation Window.

Such prior art devices need improving because the relatively large area of the viewing surface therein cannot be kept clean and protected effectively by the prior art means employed of passing of air over the viewing surface to prevent particles from pitting the surface. Prior art solutions to overcome this deficiency by inserting a perforate protective barrier between the transparent viewing device and the flame or other reaction or hazardous condition to prevent the passage of relatively large soot, unburned fuel and flack particles, etc., from hitting the glass were unsuccessful because the smaller particles were not prevented from hitting the viewing surface and the collection of particles in the mesh or perforate barrier prevented viewing after such clogging and required frequency changes of perforate barrier.

The present invention overcomes these and other disadvantages of prior art devices providing structure such that only a relatively small portion of the viewing surface can possibly be hit by impinging particles. It provides a barrier which has a conically-shaped aperture wherein a relatively small transparent element face or portion thereof is at the apex of the cone. The sides of the cone are formed from a bevel-shaped aperture in the barrier. Thus, the present invention provides protection of the viewing surface while enabling viewing over a relatively large angular (conical) area. It further provides features of adjustability of the direction or attitude of viewing over a considerable range of angular direction. In addition to adjustability of attitude of the complete system the angle of view can be varied considerably. The angle of view is varied by varying the focal length of the lens. This is done by adjusting an element inside of the lens. The present invention enables location of the camera or other viewing means at a safe distance outside of the hazardous enclosure. It also provides improved barrier protection, insulation and cooling of the optical surface installed in proximity to or within the hazardous atmosphere. It has improved features of turbulent air flow, shroud insulation means and shape and locus of elements such that the final flow of air occurs in a direction opposed to the direction of flying particles which might otherwise hit the optical surface. This air flow thus creates an air barrier against particles which might otherwise impinge on the viewing optical surface as well as cooling of that surface. The air barrier deflects all but the larger heavier particles. The larger particles are prevented from hitting the lens surface because they cannot fit through the small shroud aperture. Advantages of greater economy with less force per unit area and a smaller amount of total gas or air required is provided. Because of the inventive structure only a relatively small amount of lens surface area is exposed and requires protection. Turbulent air flow provided because of roughened inner shroud surfaces enables more efficient use of the forced air. The surfaces of the shroud extending into the hazardous enclosure are highly polished which causes reflection of heat (undesired energy) away from the internal contents to be protected.

A principal object of the present invention is to provide an improved means and method for viewing the interior of an enclosure from a remote point to determine reactive conditions, performance and/or action therein.

Another purpose of the present invention is to provide apparatus incorporating a protected variable focal length lens system in which no elements require replacement, which apparatus provides for viewing and/or televising a portion of the interior of an enclosure which has high heat or other hazardous conditions or reactions occurring therein.

Another aim of the present invention is to provide a system wherein the interior of a hot or otherwise hazardous enclosure such as a boiler, oven or kiln can be continuously observed on a closed circuit television system; wherein a television camera observes the combustion chamber through an aperture in the boiler, etc. wall by means of a relatively elongated lens assembly of variable focal length to adjust field of view enclosed in a highly polished steel shroud which has a roughened interior surface for turbulent air flow; wherein is presented as small as possible accessible lens front surface area to provide maximum protection because of inaccessibility while allowing for an exit port for air under pressure and a sufficient field of view for the lens and wherein the system has horizontal and vertical flexibility for adjustment of attitude.

Another object of the present invention is to provide a system for continuous viewing of the interior of a hazardous internal condition device such as a boiler for display in a closed television circuit to an operator or other remote audience; which system has low initial cost and infrequent requirements for maintainence; is readily installable in existing devices; which covers a wide angle of view; wherein a relatively small amount of air is required for cooling and protection of optical surfaces; which provides features of ready accessability and adaptability for removal and replacement of the television camera and for insertion of a viewing device such as a telescope or another television camera upon such removal; which provides a clear picture despite relatively high ambient furnace, etc. temperatures; wherein replacement of protective barrier parts is not necessary and wherein the television camera may be relatively distantly located with respect to the boiler or other high temperature or hazardous device to permit maximum protection of the camera to provide structure to take advantage of physical phenomena such as behavior of gas to provide maximum protection of parts which are damageable upon exposure to such ambient conditions.

While the novel and distinctive features of the invention are particularly pointed out in the appended claims, a more expository treatment of the invention, in principle and in detail, together with additional objects and advantages thereof is afforded by the following description and accompanying drawing in which:

Figure 1:
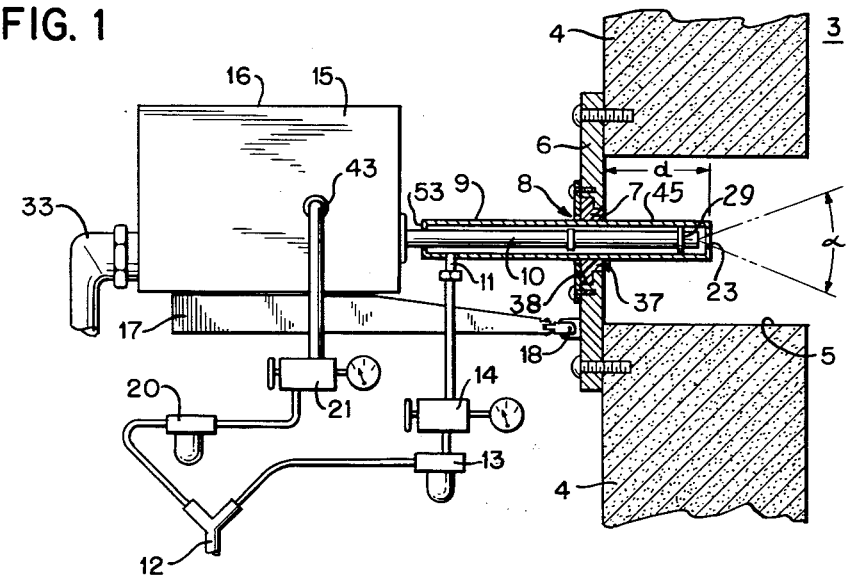
FIG. 1 is a schematic and partially pictorial representation of an illustrative embodiment of the system of the present invention.

Now referring to the drawings and in particular to FIG. 1 the inventive apparatus provides necessary or desirable remote view of the interior of a boiler, a kiln or other device or enclosure wherein hazardous conditions or reactions exist such as conditions of high temperatures attendant with combustion therein. The wall of the enclosure may be apertured and viewing apparatus of the invention may be partially inserted in the enclosure aperture. In the illustrative device of FIG. 1 such an enclosure which, for example, is a kiln 3 has a kiln wall 4 which is apertured to provide aperture 5. The aperture 5 in kiln wall 4, although larger than the inserted end of apparatus, which will be described, is made as small as possible which reduces the amount of heat which impinges upon the inserted apparatus. Secured to the kiln wall 4 to cover the aperture 5 is a plate 6 which may be of metal and which is secured to wall 4 by conventional fastening means such as screws or bolts not numbered). Extending through plate 6 is aperture 37. Plate 6 is counterbored from its outside surface to aperture 37 by a counterbore 38. A flexible gasket 7 comprising a ring (not numbered) and a boss (not numbered) which may be made of a flexible silicone material is contoured to the shape of and is fit into aperture 37 and counterbore 38. The material of gasket 7 is chosen for flexibility and resistance to high temperature. Materials other than silicone which conform to these requirements can be used. Extending through gasket 7 is an aperture 8. The reduced diameter portion or boss of silicone gasket 7 reduces the silicone surface area exposed to the heat particles from the kiln 3 to a minimum. This enables longer life for the gasket. Protruding through aperture 8 in silicone flexible gasket 7 is a protective shroud 9. Shroud 9 encloses a variable focal length lens system 10. Shroud member or shell or jacket 9 may be of stainless steel material, for example. Shroud 9 may be highly polished on its external surface 45 and roughened on its interior surface 26 for a purpose which will be described. The polished surface 45 should extend at least along the boiler or kiln enclosed end and may extend along the entire surface of shroud 9. Lens 10 and shroud 9 are of relatively elongated cylindrical shape, preferably, and are axially concentric. Shroud 9 is larger in diameter than is lens 10. The inner surface of shroud 9 is spaced from the outer surface of lens 10 along the length except for a first end wall 53 of shroud 9 which as will be described engages lens 10. Supporting and insulating spacer 29 provides spacing in fixed relationship and provides shock absorbing. Spacer 29 is disposed at near the end of the lens system and shroud assembly disposed within the enclosure wall 4. The end wall 53 of the shroud 9 provides spacing and fixed relationship at the end of the assembly away from enclosure wall 4. The spacing between the larger cylindrically-shaped shroud 9 and the cylindrically-shaped lens assembly 10 forms a plenum chamber 30 for passage of air. Inserted at the end of shroud 9 opposite its enclosure inserted end is a connection 11 from an air supply system 12. In the line between the air supply 12 and the connection 11 is a filter 13 and a reducer and gage member 14. Connected to the shroud 9 at the end (near wall 53) opposite the end (near wall 41) inserted into the hazardous reaction enclosure 3 is a television camera 15. Television camera 15 may pick up the image of the action in the interior of the boiler or kiln 3 from the lens system 10 so that it may be televised such as in a closed circuit television system. Camera 15 has a solid cover 16.

The camera 15 is located in an area adjacent kiln 3. This area may have an ambient temperature in excess of 115°. The camera 15, therefore, should be cooled for protection. A second line from the air supply 12 includes a filter device 20 and a reducer and gage 21 and extends into the camera 15 through connection 43 to provide air cooling for the camera.

In the apparatus of FIG. 1 as shown in the drawing the lens 10 and the shroud 9 are disposed in normal (orthogonal) relationship to the kiln wall 4. A moveable bracket 17 may be provided to support the camera 15 which camera may be conventionally mounted on the bracket 17 as, for example, by bolts and elongated slots (not shown). Moveable bracket 17 may be hingedly attached to the plate 6 adjacent the kiln wall 4. The hinged attachment may be a conventional universal attachment to enable change of attitude of the camera and enclosure viewing apparatus. Locking means (not shown) may be provided to fixedly attach the bracket 17 in predetermined attitude desired at the time. The universal attachment of the moveable bracket 17 to plate 6 enables the angle of view to be varied both horizontally and vertically or in any combination thereof. The angle of view α illustrated in FIG. 1 is about 45°. Greater or lesser angles of view could be provided by the inventive apparatus as desired by changing the focal length of the lens and/or by changing the angle of bevel or chamfer at surface 23.

A connector 33 from the camera 15 may be provided to cable the camera 15 output to remote television receivers or monitors (not shown).

Figure 2:
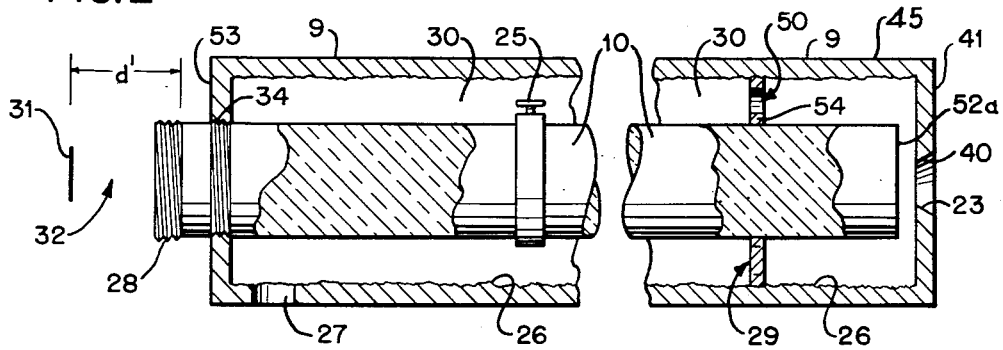
FIG. 2 is a cross-sectional schematic view of a preferred embodiment of the variable focal length lens, the surrounding shroud of the present invention and the camera image plane, the structure being shown enlarged with respect to the showing of these elements in FIG. 1.

Now referring to FIG. 2 the assembly of the variable focal length lens 10 and the cylindrical shroud 9 which encloses lens 10 are illustrated in an enlarged view. The variable focal length lens 10 is secured at one end 53 to the shroud 9 by a thread on the lens system surface which is screwed or threaded into corresponding threaded means in the aperture (not numbered) in the shroud end face 53 to form thread securing means 34. Near its other end cylindrical lens 10 is spaced from the inner longitudinal cylinder wall of the shroud 9 by means of an insulating washer 29.

Figure 3:
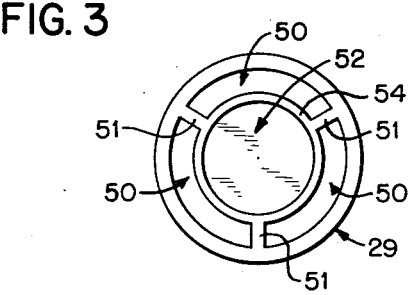
FIG. 3 is an end view of the insulating washer of FIG. 2.

Insulating washer 29 may be made of non-heat-conducting material of various types such as, for example, thermoplastic resin polytetrafluoroethylene commercially sold by one company as "Teflon." Washer 29 shown in detail in the end view of FIG. 3 is perforated such that as much air blocking material as possible is removed. This enables ready flow of turbulent air therethrough and thence through the aperture 40 in shroud end wall 41. The configuration of insulating washer 29 shown in FIG. 3 is merely illustrative of one possible embodiment. In washer 29 is a central opening 52. Radially outward of central opening 52 is a ring of material 54 and alternate apertures 50 with solid material ribs 51 therebetween. With this configuration the apertures 50 may be made of slot shape such that a minimum of material which obstructs or blocks the flow of turbulent air remains.

An air inlet 27 is provided by an aperture formed in shroud 9 and threaded with a ¼ inch standard pipe thread. Air inlet 27 permits entry of air from air supply 12 through filter 13, reducer 14 and connection 11. Inlet 27 is disposed at the lower end of the shroud 9 adjacent wall 53. This location at the end opposite the kiln enclosed end permits maximum travel of air for cooling along the entire lens system 10. Maximum length of travel along rough inner surface 26 provides also for maximum turbulence of air flow.

The variable focal length lens 10 is provided with a screw type C mount comprising a 1"-32 thread lens end 28 for connection to the vidicon camera 15. Television cameras other than those employing a vidicon tube (image orthicon, etc.) can be used and the type mount used will vary accordingly.

The image plane 31 of camera 15 may be located a distance $d'$ in front of the bottom of the thread of threaded mount 28. Distance $d'$ may be 0.69 inch, for example.

The inner surface 26 of the elongated cylindrical shroud 9 is roughened to cause turbulence of air flow therealong in the plenum chamber 30 between the outer cylindrical wall of the lens 10 and the inner cylindrical wall of the shroud 9. Thus the air introduced in air inlet 27 after flowing substantially the length of shroud 9 is ejected as a turbulent swirling mass of air from orifice 40 in the end wall 41 of shroud 9. The ejection of turbulent air in a substantially normal or orthogonal direction from the face 52a of the lens 10 near shroud end wall 41 permits maximum buffer action. This buffer action protects the lens face 52a by causing the turbulent air flow to act as a barrier against smoke, soot, smog and other foreign matter particles, and unburned fuel which are projected normally at high velocity in a direction directly against the lens surface. The air stream buffer action also prevents impingement of corrosive gases on the end face 52a of the lens 10. The stream of air ejected from exit port 40 of shroud 9 is ejected normally (orthogonally) as a conical shaped mass barrier against the impingement of materials. The air cone is shaped by bevel or chamfered surfaces 40 with the apex of the cone being approximately at the longitudinal axis of lens 10 and at its face 52a. The turbulent flow of air along the length of the space 30 caused by the roughened surface 26 enables better cooling of the lens member 10. In addition, this turbulence causes continuous supplies of fresh cooled air to be disposed adjacent the actual inner surface of the shroud 9 such that heat is readily exchanged to and dissipated in the inner turbulent air rather than being conducted along the surface of the shroud and through its end wall 53 into lens member 10.

With laminar flow of air along the space 30 a layer of outer air would be located against the inner surface of the shroud 9 without removal or displacement therefrom. In the present invention, more efficient heat transfer takes place because the rate of heat flow from a high temperature area to a low (new air) temperature area is greater than from high temperature area to a high temperature area (heated mass of unreplenished air). The present invention thus provides efficient cooling because of turbulent flow of air in the space 30 along the shroud 9 between the lens 10 which should be protected and the outer hot portion of the shroud 9.

The outer surface of the shroud 9 is highly polished for further protection of lens 10. Heat is reflected from that polished surface 45. If not reflected this heat would be conveyed to the lens member 10.

A portion of the lens 10 and cylindrical shroud 9 extends into the boiler, kiln etc., a distance $d$. The elongated cylindrical shape of the lens 10 and of the surface of the shroud 9 provides protection for the lens 10 because of the relatively small exposed area of the optical instrument and protective shroud or guard inserted therein. The thin cylindrical shape provides the smallest area of exposure to heat consistent with good ability to view into the hazardous enclosure.

Because of the relatively small size of aperture 40 particularly at the smallest diameter of bevel opening, a very small portion of the lens surface of lens face 52a is exposed. This provides maximum protection of that surface. Aperture 40 is made of small diameter such that larger particles are too great in size to be projected through. The smaller particles are likely to be deflected by the air stream which is forced thereagainst so that likelihood of either small or large particles contacting the lens is reduced to minimum probability because of the sizing of aperture 40 and the chamfered contour 23 of aperture 40.

The small aperture 40 acts like a nozzle. The Venturi principle is exercised in that the air in going through the reduced diameter aperture goes through with increased velocity. Thus, a higher velocity of air stream is directed against the oncoming particles to prevent their impingement on the lens surface.

The resultant expansion of air around the bevelled surfaces 23 from relatively small aperture 40 into the relatively large volume internally of aperture 5 in the wall 4 results in maximum cooling at the lens surface in the location where greatest cooling is required. The expansion of the volume of air on going from the narrow orifice out into the larger space internally of the kiln or boiler, or enclosures, etc. wall aperture, is achieved by the air or gas removing heat from the region surrounding the aperture 40 to give this increased volume. This is in accordance with the consideration of the general gas law (combining Boyle's and Charles' laws). Thus, the cooling effect is enhanced in the area near face 52a of lens 10 thereby further providing cooling and protection for the end face 52a of lens 10. The variable focal length lens 10 is made adjustable by lens adjustment member 25. Adjustment member 25 may be set at desired position along lens system 10 to thus adjust the focal length of the lens to predetermined desired system focal length. Lens 10 is adjustable in focal length between the approximate limits of from 15 millimeters to 50 millimeters (mm.).

The field of view is varied by the variable focal length adjustment member 25. The adjustment of focal length within the range of from 15 millimeters to 50 millimeters permits adjustment of field of view approximately between the angles of 15 degrees to 50 degrees.

Referring again to FIG. 1 the action or reaction occurring in the angle of view (field of view) is optically transmitted through the lens 10 to present an image of this action at the image plane 31 of the camera 15. The camera 15 shown employs a vidicon pick-up tube. Its image plane is at distance $d'$ from the back of the thread 28 of the variable focal length lens 10.

The scene within the angle of view $\alpha$ at the opposite end of the variable focal length lens 10 is thus imaged at image plane 31 and is televised by camera 15.

The invention described herein thereby provides a system in which the interior of a hazardous reaction enclosure device such as a boiler, kiln or oven can be continuously observed remotely in a closed television circuit system. The invention provides for emergency viewing by an observer or using a scene responsive device to temporarily replace the television camera of the closed circuit television system. A lens assembly of variable focal length is enclosed in a stainless steel shroud which is highly polished on its exterior surface. The shroud is inserted in a flexible holder or gasket of high temperature resistant material. The flexible gasket is inserted in an aperture in the hazardous enclosure or in a cover member therefor. The lens and shroud assembly protrudes into the enclosure. The assembly is shaped to present as small an amount of exposed surface as possible consistent with practical viewing and adjustability. The front of the shroud has a small opening or aperture to allow for exit of air under pressure forced turbulently into a plenum chamber formed between the lens and its inner shroud surface which is spaced from the lens. The small exit aperture is bevelled or chamfered to provide a proper field of view for the lens. The exit aperture is of size to insure that a minimum amount of particles strike the lens surface. Air from the shroud exit aperture acts as a barrier for the smaller particles. The exit aperture is too small for the larger particles which the air does not deflect to get past to strike the lens. The interior surface of the shroud is roughened for maximum heat transfer due to the turbulence of air flowing therealong. The turbulence is effected by the irregular surface. Horizontal and vertical adjustment of attitude of the viewing device is provided by the flexible deformable gasket disposed in the plate attached to the wall of the oven, kiln, etc. The support bracket for the viewing assembly is made universally moveable at the oven connected end to allow the support attitude to follow attitude adjustment of the variable focal length lens device. The focal length variable adjustment permits adjustment of the angle of view of the lens system.

The elongated shape of the shroud and lens system enables the camera to be removed a greater distance from the enclosure wall and its hot or hazardous interior. The roughened inner wall of the shroud which defines the outer wall of the plenum chamber enables better heat transfer inside the shroud into the cooling air. Since the air supply is introduced at the plenum chamber 30 end furthest away from the enclosure wall 4, turbulent flow and cooling occur along the entire length. The air supply is also used to cool the camera. This protects against deleterious effects from the ambient atmosphere of high temperature (for example, about 115° C.) near the boiler, oven, kiln, etc. The reflective polished surface reflects heat away from the shroud. The dimensioning of the lens, shroud and hazardous chamber and the structural features which take advantage of favorable gas law principles provide increased cooling or heat removal and lowered temperature effect. Hence a lower amount of air supply is required. This provides economy.

A 1" 32 thread was used in the type C mount 28 of the illustrative embodiment. However, the standard thread used depends on the television camera with which the system is to be used.

Although the invention is not to be construed as limited thereby, dimensions of one embodiment include a shroud length of fourteen inches with a shroud outer diameter of two and one half inches and a lens diameter of one and one quarter inches. The shroud wall thickness is one eighth inches. The aperture in the front wall facing the heat or hazardous conditions is a one quarter inch diameter hole with a forty-five degree chamfer.

It should be understood that in the inventive apparatus removal of the camera is provided for. Upon failure or when servicing of the camera is desired, the camera may be unscrewed from the lens. Viewing of the operation within the hazardous enclosure may be continued by providing a substitute threaded eye piece for viewing by a human while the television camera is repaired, substituted, etc. The eye piece is preferably threaded with the same thread as the camera mount used with the system.

It should be understood, of course, that the invention is not restricted to a particular lens system nor to use with a kiln, boiler or oven; it is adaptable for applications including other hazardous type operations effected in enclosures. The invention is also not restricted to the type of camera used with the present lens system which employs a vidicon tube.

While a specific embodiment of the invention has been shown and described, it should be recognized that the invention should not be limited thereto. It is accordingly intended in the appended claims to claim all such variations as fall within the true spirit of the invention.

What is claimed is:

1. In combination with an apertured enclosure wherein a high temperature reaction is being performed, apparatus for remote viewing of said reaction comprising a shroud, said shroud having a front, a rear and longitudinal walls, an adjustable focal length lens having a front face in proximity to said front shroud wall and being enclosed along its length and at said front by said shroud and in spaced relationship to form a plenum chamber therebetween, means to supply air under pressure to said plenum chamber, means to cause turbulent flow of said air under pressure, said shroud being apertured at its front end wall with a small chamfered outwardly extending aperture, said front end of said lens and a portion of said shroud adjacent and including said shroud front end wall being inserted in said enclosure aperture, means to cause turbulent flow of said air under pressure, a television camera secured to said lens at the end opposite said enclosure entering end and being disposed to televise the scene imaged by said lens.

2. In combination an enclosure which houses a reaction process, means for televising the reaction process for remote display of said process and means to convey optically an image of said reaction process to said television means, said enclosure being apertured, a lens system and a protective shroud of a configuration disposed to protrude through said enclosure aperture and partly within said enclosure, said televising means being connected in the end of said lens system opposite said enclosure protruding end, said shroud being circumferentially spaced from said lens to form a plenum chamber therebetween, said shroud member having a relatively small diameter shroud aperture through its face portion protruding into said enclosure to expose the interior of said enclosure to the face of said lens, a supply of gas under pressure connected to said plenum chamber, said gas flowing along said plenum chamber to cool said lens and flowing substantially orthogonally out of said shroud aperture so that it acts as a barrier to protect the lens face from particles from the reaction striking the lens, said means for televising the reaction comprises a closed circuit television system, said television connected means comprising a television camera having a threaded extension disposed ahead of the face of the camera tube of said camera, said lens being threaded to matingly receive said extension, said lens being of variable focal length for adjustment of its field of view.

3. Apparatus for viewing the interior of an enclosure at a point disposed externally of and spaced from said enclosure, said enclosure being apertured, said apparatus comprising an elongated cylindrical shell having an end wall, an apertured gasket member covering the aperture of said enclosure, said shell being retained in the aperture of said member to be disposed partially within and partially without said enclosure, said shell end wall being apertured to form an opening of small diameter of the approximate order of particles which fly from the interior of said enclosure toward said shell end wall, said shell end wall being chamfered at the periphery of its aperture to permit an outwardly expanding conical field of view from the inside of said shell, a lens system of elongated cylindrical shape, said shell being of larger diameter than and axially and on one end surrounding said lens system in spaced relation to form a protective housing for said lens and a plenum chamber between said shell and said lens, television remote display means including a television camera connected to said lens and responsive to imaging from said lens system, means to move a gas under pressure in said plenum chamber to provide cooling of said lens and a gas stream projected from said lens face aperture, and gas inlet means disposed at the end of said shell opposite its end retained within said enclosure.

4. The apparatus of claim 3 wherein said apertured gasket member is flexibly deformable and is composed of a material which is relatively unaffected by ambient conditions of said enclosure, and means to adjust the attitude of said lens and said shell, said flexibly deformably member permitting said change of attitude.

5. The apparatus of claim 4 including a cover member for said enclosure, said enclosure being apertured therethrough and being counterbored from the external face of the enclosure cover through a portion of the cover thickness, said deformable member comprising a boss seated within said cover member aperture and a body portion seated within said cover member counterbore to reduce flexible member surface exposed to said enclosure interior.

6. The apparatus of claim 3 including means for adjusting the focal length of said lens to thereby provide a variable field of view and means for adjusting the attitude of the lens and shell, said last-named means comprising a vertically and horizontally adjustable shell support member.

7. The apparatus of claim 3, the inner surface of said shell being roughened to provide turbulent flow of gas therethrough to facilitate cooling and prevent heat from being conducted to the lens.

8. The apparatus of claim 3, wherein at least the portion of the outer surface of said shell exposed to the interior of said enclosure is polished to thereby provide reflection of heat away from the shell and lens assembly to protect the lens.

9. The apparatus of claim 3 including a spacer member of heat insulating material disposed between the inner wall of the shell and the outer wall of the lens, said spacer member having a central aperture enclosing the lens and a plurality of radially spaced apertures greater than the area of material left to form vanes of insulating material, thereby permitting support to maintain spacing of said shell from said lens to define a plenum chamber of constant area throughout its length while permitting substantially unobstructed flow of gas along said plenum chamber, said gas increasing in velocity of gas stream flow in the small aperture of the shell end wall and expanding past the shell end wall aperture to provide further cooling in the approximate region of said lens face.

10. The apparatus of claim 3 wherein said gas pressure means comprises an air supply system having a first and a second branch, said first branch being connected to said shell inlet and said second branch being connected to said television means, and wherein said connection means comprises threaded means cooperating with said television camera to provide connection such that the camera tube face of said television display means is disposed in the image plane of said lens.

11. Means for presenting a remote television display of the interior of a high temperature reaction enclosure, said means comprising a closed circuit television system including a television camera, a variable focal length lens system connected to said camera such that the tube face of said camera is in the image plane of said lens system, said lens system being of elongated cylindrical configuration and having a first and a second end face, an elongated hollow cylindrical shroud of greater diameter than said lens system enclosing said lens system in circumferentially spaced relationship axially and substantially along the length of the lens system to form a plenum chamber therebetween, said shroud having a first and a second end wall, said first shroud end wall being apertured, said lens system being disposed to protrude through said first shroud end wall, means to secure said lens system near its first end face to said shroud in said first shroud end wall, the second end wall of said shroud being spaced from the second lens end face and being apertured to provide a relatively small diameter opening, said enclosure being apertured to receive a portion of the length of said shroud and lens system, the shroud small aperture end protruding into said enclosure and the shroud other end being disposed externally of said enclosure such that the interior of the enclosure is imaged by the lens system viewing through said enclosure aperture and means to supply air under pressure into said plenum chamber and out of said second end wall aperture.

12. The apparatus of claim 11 including first platform means to support said camera and shroud, second deformable heat resistant material means to support said shroud, said deformable means being in circumferentially bearing relationship along a portion of the shroud length at the enclosure aperture, means to adjust said platform support means horizontally and vertically to adjust the attitude of said shroud and of its enclosed lens system, the deformable means yielding to permit adjusted attitude of said shroud.

13. The apparatus of claim 11 wherein said second shroud end wall aperture is bevelled to extend the field of view from said lens, said shroud having an air inlet aperture normal to said shroud and extending into said plenum chamber, said air inlet being disposed substantially adjacent to said first end of said shroud said air supply means being connected to said air inlet, said shroud having a roughened inner surface such that turbulent air flow along the length of said plenum chamber and against particles in said reaction enclosure which are directed toward said second lens face is caused, said air flow increasing in velocity in the constricted region through said second shroud aperture compared to its velocity in the plenum chamber and expanding on leaving said second shroud and aperture to cause cooling of the area adjacent said second face of said lens, the turbulence of said air flow facilitating exchange of heat from the area surrounding said shroud to said air in said plenum chamber.

14. The apparatus of claim 13 including a washer of heat insulating material disposed in the vicinity of said second shroud wall and between said lens system and said shroud to support said lens and said shroud in spaced relationship, said washer having a plurality of radially outwardly extending apertures, said washer apertures being large in comparison to the solid washer material inbetween to permit maximum unrestricted flow of air through said washer, said shroud being polished on its exterior surface to reflect heat away from said lens system.

15. The apparatus of claim 13 including means connected to said air supply means and to said television camera to provide cooling of said television camera simultaneously with cooling of the air supply.

16. Apparatus for viewing the operation in a high-temperature reaction chamber, said chamber having a relatively small aperture in at least one wall, said apparatus comprising an elongated cylindrically shaped metal shroud having a highly-polished outer surface to provide reflection of heat therefrom, said shroud having an aperture disposed at one end, said one shroud end protruding within said chamber aperture, a plate member sealing off said chamber aperture, said plate member being apertured, a resilient flexible gasket member mounted within said plate aperture to surround said shroud member yieldingly while providing a heat seal with the outer surface thereof, a variable focal length lens variable between approximately fifteen and fifty millimeters focal length, said lens being disposed axially concentric with and within said shroud and being of lens diameter with relation to the inside diameter of said shroud to provide a plenum chamber therebetween, means to inject air under pressure at the end of said shroud removed from said chamber, said shroud having a rough inner surface to provide turbulent movement of said introduced air to thereby provide greater heat exchange between the ambient air surrounding said shroud and the cooling air disposed in said plenum chamber, said aperture at the end of said shroud being of reduced diameter so as to permit cooling of that end by expansion of air upon being ejected from said aperture, and to give it greater velocity so as to act as a substantial barrier against particles from said chamber impinging upon the end surface of said lens, said aperture size being as small as possible consistent with viewing to thereby reject particles substantially larger than those of size deflectable by said air barrier, the aperture at the end of the shroud being bevelled to enable a conical field of view, a camera disposed adjacent to said shroud at the end opposite the chamber enclosed end and connected thereto, said camera having a vidicon tube in axial alignment with said variable focal length lens to thereby receive the image of objects within the angle of view within said chamber, to thereby permit a televised image to be transmitted from said camera, and movable bracket means attached to said plate and said camera to permit adjustment of attitude of said camera and its attached variable focal length lens and shroud assembly.

References Cited in the file of this patent

UNITED STATES PATENTS

| | | |
|---|---|---|
| 2,054,382 | Larsen | Sept. 15, 1936 |
| 2,637,972 | Laucher | May 12, 1953 |

FOREIGN PATENTS

| | | |
|---|---|---|
| 491,714 | Great Britain | Sept. 1, 1938 |

OTHER REFERENCES

"Closed-Circuit Television Systems," RCA Service Co., copyright 1958; see addenda, pp. 13 through 18.

"TV in Power Stations," from "Mechanical Engineering," December 1951, pp. 1008 and 1009.